US006225256B1

(12) United States Patent
Shawabkeh et al.

(10) Patent No.: US 6,225,256 B1
(45) Date of Patent: May 1, 2001

(54) ACTIVATED CARBON FEEDSTOCK

(75) Inventors: Reyad Shawabkeh; David A. Rockstraw; Rohinton K. Bhada, all of Las Cruces, NM (US)

(73) Assignee: New Mexico State University Technology Transfer Corporation, Las Cruces, NM (US)

( * ) Notice: Subject to any disclaimer, the term of this patent is extended or adjusted under 35 U.S.C. 154(b) by 0 days.

(21) Appl. No.: 09/090,451

(22) Filed: Jun. 4, 1998

Related U.S. Application Data

(60) Provisional application No. 60/048,579, filed on Jun. 4, 1997, and provisional application No. 60/062,772, filed on Oct. 24, 1997.

(51) Int. Cl.$^7$ .................................................... L01B 31/12
(52) U.S. Cl. ........................ 502/424; 502/423; 502/425; 502/426; 502/427
(58) Field of Search ................................. 502/426, 425, 502/424, 427, 423

(56) References Cited

U.S. PATENT DOCUMENTS

| | | |
|---|---|---|
| 3,976,597 | 8/1976 | Repik et al. . |
| 4,014,817 | 3/1977 | Johnson et al. . |
| 4,082,684 | 4/1978 | Wennerberg et al. . |
| 4,239,516 | 12/1980 | Klein . |
| 4,344,775 | 8/1982 | Klein . |
| 4,395,332 | 7/1983 | Klein . |
| 4,454,044 | 6/1984 | Klein . |
| 4,616,001 | 10/1986 | Sato . |
| 4,629,476 | 12/1986 | Sutt, Jr. . |
| 4,643,182 | 2/1987 | Klein . |
| 4,760,046 | 7/1988 | Biirger et al. . |
| 5,039,651 | 8/1991 | Kosaka et al. . |
| 5,102,855 | 4/1992 | Grienke et al. . |
| 5,162,286 * | 11/1992 | MacDawall ........................ 502/425 |
| 5,162,288 | 11/1992 | Stringaro . |
| 5,164,355 | 11/1992 | Farris . |
| 5,198,398 | 3/1993 | Van Duijn . |
| 5,356,852 | 10/1994 | DeLiso et al. . |
| 5,407,574 | 4/1995 | Hensley . |
| 5,416,056 | 5/1995 | Baker . |
| 5,710,092 | 1/1998 | Baker . |

FOREIGN PATENT DOCUMENTS

1770273 A1    10/1992    (SU) .

OTHER PUBLICATIONS

Iley, M., et al., "The Adsorptive Properties of Carbonised Olive Stones", *Carbon*, 1973, pp. 633–639, vol. 11, Pergamon Press, Great Britain.

Jagtoyen, M., et al., "Activated Carbons from Yellow Poplar and White Oak by $H_3PO_4$ Activation", *Carbon*, 1998, pp. 1085–1097, vol. 36, No. 7–8, Elsevier Science Ltd., Great Britain.

Jagtoyen, M., et al., "Some Considerations of the Orgins of Porosity in Carbons from Chemically Activated Wood", *Carbon*, 1993, pp. 1185–1192, vol. 31, No. 7, Pergamon Press Ltd., Great Britain.

Juntgen, H., "New Applications for Carbonaceous Adsorbents", *Carbon*, 1977, pp. 273–283, vol. 15, Pergamon Press, Great Britain.

Kirubakaran, C.J., et al., "Experimental Study of the Production of Activated Carbon from Coconut Shells in a Fluidized Bed Reactor", *Ind. Eng. Chem. Res.*, 1991, pp. 2411–2416, vol. 30, American Chemical Society.

Ku, B.J. et al., "Treatment of Activated Carbon to Enhance Catalytic Activity for Reduction of Nitric Oxide with Ammonia", *Ind. Eng. Chem. Res.*, 1994, pp. 2868–2874, vol. 33, American Chemical Society.

Marshall, W.E., et al., "Agricultural Byproducts as Adsorbents for Metal Ions in Laboratory Prepared Solutions and in Manufacturing Wastewater", *J. Environ. Sci. Health*, 1995, pp. 241–261, vol. A30, No. 2, Marcel Dekker, Inc.

Moore, W.S., et al., "Extraction of Radium from Natural Waters Using Manganese–Impregnated Acrylic Fibers", *Journal of Geophysical Research*, Dec. 20, 1973, pp. 8880–8886, vol. 78, No. 36, American Geophysical Union.

Muthukumaran, K., et al., "Removal and Recovery of Chromium from Plating Waste Using Chemically Activated Carbon", *Metal Finishing*, Nov. 1995, pp. 46–53.

Pis, J.J., et al., "Preparation of Active Carbons from Coal Part I. Oxidation of Coal", *Fuel Processing Technology*, 1996, pp. 119–138, vol. 47, Elsevier Science B.V.

Rodriguez–Reinoso, F., et al., "Activated Carbons from Almond Shells–I, Preparation and Characterization by Nitrogen Adsorption", Carbon, 1982, pp. 513–518, vol. 20, No. 6, Pergamon Press Ltd., Great Britain.

Rodriguez–Reinoso, F., et al., "Activated Carbons from Lignocellulosie Materials By Chemical and/or Physical Activation: An Overview", Carbon, 1992, pp. 1111–1118, vol. 30, No. 7, Pergamon Press Ltd., Great Britain.

Rodriguez–Reinoso, F., et al., "The Use of Steam and $CO_2$ as Activating Agents in the Preparation of Activated Carbons", *Carbon*, 1995, pp. 15–23, vol. 33, No. 1, Elsevier Science Ltd., Great Britain.

Streat, M., et al., "Sorption of Phenol and Para–Chlorophenol from Water Using Conventional and Novel Activated Carbons", *Wat. Res.*, 1995, pp. 467–472, vol. 29, No. 2, Elsevier Science Ltd., Great Britain.

(List continued on next page.)

Primary Examiner—Stuart L. Hendrickson
(74) *Attorney, Agent, or Firm*—Deborah A. Peacock; Brian J. Pangrle

(57) ABSTRACT

An activated carbon and method of producing and using same. Pecan hulls are fractured to produce a particle size of less than a predetermined size (e.g., 75 microns), chemically activated in an acid solution, carbonized, and washed.

47 Claims, No Drawings

OTHER PUBLICATIONS

Tamon, H., et al., "Adsorption of Carbon Monoxide on Activated Carbon Impregnated with Metal Halide", *AIChE Journal*, Feb., 1996, pp. 422–430, vol. 42, No.2.

Teng, H., et al., "Preparation of Activated Carbon from Bitumionous Coal with Phosphoric Acid Activation", *Carbon*, 1998, pp. 1387–1395, vol. 36. No. 9, Elsevier Science Ltd., Great Britain.

Vyas, S.N. et al., "Adsorption of Gases on Carbon Molecular Sieves", *Journal of Colloid and Interface Science*, 1994, pp. 275–280, vol. 168, Academic Press, Inc.

Watanabe, N., et al., "Fluorination of Carbon Black", *Carbon*, 1979, pp. 359–363, vol. 17, No. 4–D, Pergamon Press Ltd., Great Britain.

Zeid, N.A., et al., "Activated Carbon Adsorption in Oxidizing Environments", *Water Res.*, 1995, pp. 653–660, vol. 29, No. 2, Elsevier Science Ltd., Great Britain.

News Article "Pecan Shells Can Be Promising New Filter Material, " Albuquerque Business Times (Dec. 23, 1996–Jan.6, 1997).

Kirk–Othmer, "Encyclopedia of Chemical Terminology," Fourth Edition *Wiley–Interscience Publication*, John Wiley & Sons, pp. 1020 and 1034 (no year available).

News Article "Pecan Shells Used to Clean Waste Water," Las Cruces Sun–News, (Nov. 19 1996).

News Article "Pecan Shells could Clean Water Polluted by El Paso's Industry," Las Cruces sun–News (Nov. 11, 1996).

News Article "NMSU Chemical Engineers Apply for Unique Pecan filter Patents, " Round Up, (Nov. 4, 1996).

Ahmadpour, A., et al., "The Preparation of Activated Carbon from Macadamia Nutshell by Chemical Activation", *Carbon*, 1997, pp. 1723–1732, vol. 35, No. 12, Elsevier Science, Ltd., Great Britain.

Aggarwal, P., et al., "The Production of Active Carbon from Corn Cobs by Chemical Activation", *Journal of Thermal Analysis*, 1997, pp. 525–531, vol. 50, John Wiley & Sons, Limited, Chichester.

Bevia, F. Ruiz, et al., "Activated Carbon from Almond Shells. Chemical Activation. 1. Activation Reagent Selection and Variables Influence", *Ind. Eng. Chem. Prod. Res. Dev.*, 1984, pp. 266–269, vol. 23, American Chemical Society.

Ferro–Garcia, M.A., et al., "Removal of Lead from Water by Activated Carbons", *Carbon*, 1990, pp. 545–552, vol. 28, No. 4, Pergamon Press, Great Britain.

Haimour, N.M., "Feasibility of "GIFT"for Acid Effluent Pollution Control", *Dirasat, Series B (Pure and Applied Sciences)*, 1990, pp. 7–21, vol. 17, No. 1.

Hassan, N.M., et al., "Adsorption of Radon and Water Vapor on Commercial Activated Carbons,", *Separation Science and Technology*, 1995, pp. 565–583, vol. 30, No. 4, Marcel Dekker, Inc.

Heschel, W., et al., "On the Suitability of Agricultural By–Products for the Manufacture of Granular Activated Carbon", *Fuel*, 1995, pp. 1786–1791, vol. No. 12, Elsevier Science, Ltd., Great Britain.

Zhonghua, H., et al., "Carbon Molecular Sieves Produced from Walnut Shell", *Carbon*, 1995, pp. 561–567, vol. 33, No. 5, Elsevier Science, Ltd., Great Britain.

* cited by examiner

ACTIVATED CARBON FEEDSTOCK

CROSS-REFERENCE TO RELATED APPLICATIONS

This application claims the benefit of the filing of U.S. Provisional Patent Application Ser. Nos. 60/048,579 and 60/062,772, both entitled Novel Activated Carbon Feedstock and Manufacture Technique, filed on Jun. 4, 1997, and Oct. 24, 1997, respectively, and the specifications thereof are incorporated herein by reference.

BACKGROUND OF THE INVENTION

1. Field of the Invention (Technical Field)

The present invention relates to compositions and methods of making and using same as an adsorbent or catalyst material, particularly activated carbons.

2. Background Art

Activated carbon finds widespread use for adsorption of gaseous, liquid and dissolved materials. Typically such materials are present as toxins or contaminants in a fluid or process stream; however, sometimes the adsorbed material has value. For instance, many metal ions pose both a risk (heavy metal toxicity) and a benefit (resale value). In the photographic film processing industry, the economics of silver recovery are favorable if silver ions can be efficiently recovered from wastewater. In addition, less silver flows into the environment. Most removal processes make use of an activated carbon filter, e.g., cartridges, fluidized beds, packed beds, etc., through which the process stream flows. As the process stream flows through the filter, the contaminant or other material is adsorbed onto the surface of the activated carbon. Activated carbon derives its adsorptive properties predominantly from a high surface area to mass ratio. The adsorbed materials essentially condense on the activated carbon's solid surface. The so-called carbon "activation" process, of which there are many, enhances the carbon's surface area to mass ratio.

Commonly used activation processes treat the carbon containing raw material stock in a thermodynamic and/or chemical manner. Thermodynamic treatments includes high temperature and high pressure processes while chemical treatments typically rely on acids or bases like phosphoric acid or sodium hydroxide. Some chemical activation processes use Lewis acids like zinc chloride. In most instances, thermal treatment processes use temperatures exceeding 500° C., thereby making energy input an important economic consideration. The raw materials may come from synthetic or natural sources, e.g., resin wastes, coal, coal coke, petroleum coke, lignites, polymeric materials, and lignocellulosic materials including pulp and paper, residues from pulp production, wood, nut shell, kernel and fruit pits. Organic materials find widespread use as a starting material; however, supply issues may impact availability. Often pretreatment steps prepare the raw material for activation. For instance, fracturing materials like nut shells and fruit pits through grinding increases the raw material's available surface area thereby increasing the effectiveness of the activation step(s). An increase in surface area will typically decrease resistance to both heat and mass transfer. A decreased resistance to mass transfer facilitates chemical permeation into the interior of the raw material while a decreased resistance to heat transfer facilitates both heat diffusion and conduction into the interior of the raw material. Whether through thermodynamic and/or chemical means, the activation process enhances the pore structure and leads to a significant increase in the surface area to mass ratio.

Typical commercially available activated carbon products have a specific surface area to mass ratio of at least 300 $m^2g^{-1}$ while some have ratios exceeding 2000 $m^2g^{-1}$. Much of the surface area resides, however, within the activated carbon's porous structure. Therefore, the activated carbon's pore size distribution and tortuosity may control selectivity as well as the rate of adsorption. Some commercially available activated carbon products have pore widths less than 10 Å; small pore widths generally exclude large molecules. Activated carbon with a pore size distribution skewed toward small widths may not function effectively to remove large molecules, such as dyes, from waste streams. In general, most commercially available activated carbon products do not function effectively to remove dyes from waste streams. Other commercially available activated carbon products fail to effectively remove ionic species. Ionic species often have hydrophilic properties and, in aqueous solutions, carry a hydrated shell of substantial thickness. Thus, activated carbon that possesses hydrophobic surface characteristics may not adsorb ionic species effectively.

Another issue that arises with most commercially available activated carbon is deactivation, a process whereby the adsorptive capacity of the carbon decreases through use. The two main options to overcome deactivation are replacement and reactivation through regeneration. Processes used for regeneration often mirror those used for activation. Most existing regeneration methods require treatment of the "deactivated" carbon in an oven at high temperatures. First, however, the "deactivated" carbon must be removed from the process, few techniques are capable of in-situ regeneration. Second, absent a low cost energy source, the economics of heat driven regeneration are seldom favorable since the carbon usually experiences a drop in effectiveness after several high temperature regeneration cycles. The present invention provides a composition and method of making same that is both useful for removing large molecules and ionic molecules with an additional advantage in that the carbon can be regenerated in-situ, without removal from the filtration system. The present invention also uses temperatures that minimize energy input and are thus economically favorable.

Prior art related to the invention includes U.S. Pat. No. 5,710,092, to Baker, entitled "Highly Microporous Carbon," (discloses activation of a carbon material at temperatures from 650° C. to about 1100° C.); U.S. Pat. No. 5,416,056, to Baker, entitled "Production of Highly Microporous Activated Carbon Products," (discloses a two step combined chemical and thermal process for activation of lignocelluloic material wherein the first step uses temperatures between 150° C. and 590° C. and the second step uses temperatures between 650° C. and 980° C.); U.S. Pat. No. 5,407,574, to Hensley, entitled "Filter Media for Filter Systems" (employs mixture including crushed pecan hulls as filter media); U.S. Pat. No. 5,356,852, to DeLiso et al., entitled "Activated Carbon Structures" (uses activated carbon as a starting material for making filters thereby avoiding need for firing/sintering in making the filters); U.S. Pat. No. 5,198,398, to van Duijn, entitled "Method for Regenerating Spent Activated Carbon and Portable Container for Use Therein" (regeneration of activated carbon at temperatures between 800° C. and 1000° C.); U.S. Pat. No. 5,102,855, to Greinke et al., entitled "Process for Producing High Surface Area Activated Carbons," (discloses a process using thermal treatment of carbon at temperatures from 450° C. to 1200° C.); U.S. Pat. No. 5,039,691, to Kosaka et al., entitled "Chemically Activated Shaped Carbon, Process for Producing Same and Use Thereof," (discloses a process that utilizes temperatures between 500° C. and 700° C. for activation of carbon material); U.S. Pat. No. 4,760,046, to Burger et al., entitled "Process for the Production of Activated Carbons using Phosphoric Acid," (discloses a two step combined chemical and thermal process for activation of carbon wherein the first step uses a rapid thermal treatment between 80° C. and 250° C. followed by a step using temperatures between 250° C. and 500° C.); U.S. Pat. No. 4,643,182, to Klein, entitled "Disposable Protective Mask" (gas-adsorbing activated carbons, including from pecan nut shells, employed); U.S. Pat. No. 4,616,001, to Sato, entitled "Activated Carbon," (activates macadamia nut shells at temperatures between 400° C. and 900° C.); U.S. Pat. No. 4,569,756, to Klein, entitled "Water Treatment System" (activated carbons, including from pecan nut shells, used in water treatment); U.S. Pat. No. 4,454,044, to Klein, entitled "Water Treatment Process" (activated carbons, including from pecan nut shells, used in water treatment); U.S. Pat. No. 4,395,332, to Klein, entitled "Adsorption and Filtration Mat for Liquids" (activated carbon, including from pecan nut shells, employed); U.S. Pat. No. 4,344,775, to Klein, entitled "Method for Separating Gases Liquid Droplets and/or Solid Particles from Gases or Vapors" (activated carbon, including from pecan nut shells, employed); and U.S. Pat. No. 4,239,516, to Klein, entitled "Porous Media to Separate Gases Liquid Droplets and/or Solid Particles from Gases or Vapors and Coalesce Entrained Droplets" (activated carbon, including from pecan nut shells, employed).

SUMMARY OF THE INVENTION
(DISCLOSURE OF THE INVENTION)

The present invention is of a method of producing an activated carbon comprising: fracturing pecan hulls to a particle size of less than a predetermined size; chemically activating the ground hulls in a solution; carbonized the chemically activated hulls; and washing the carbonized hulls. In the preferred embodiment fracturing reduces the particle size of the pecan hulls to less than approximately 75 microns. A chemically activating step is employed using a solution containing an acid such as phosphoric acid, hydrochloric acid, sulphuric acid, nitric acid, carbonic acid, acetic acid, aluminum chloride, ferric chloride, zinc chloride, or the like. Alternatively, a base such as sodium hydroxide, potassium hydroxide, ammonia, monoethanolamine or the like is employed. A chemically activating step using oxygen from a source such as, air, a substance containing oxygen molecules, a substance that causes the release of oxygen molecules upon contact with water, a substance that releases oxygen molecules upon a temperature change, or a substance that releases oxygen molecules upon a change in pH may be employed. Pretreatment of raw materials are also within the scope of the invention via soaking of the ground pecan hulls in water prior to the chemically activating step. Carbonizing is preferably by washing the chemically activated hulls or heating the chemically activated hulls in a muffle furnace. Washing is preferably repeated washing of the chemically activated hulls in deionized water or agitation of the chemically activated hulls in basic solution. The method may be used to manufacture activated carbon, such as, from powdered pecan shells that have been chemically activated in a solution and then carbonized. The invention may use a chemically activating solution comprising an acid, Lewis acid, and base. Activated carbon manufactured by the method of the invention preferably uses powered pecan shells having a particle size of less than approximately 75 microns, preferably adsorbs at least one of the following at the specified amount: methylene blue dye at greater than or equal to approximately 280 milligrams of dye per gram of activated carbon; metal cations at greater than or equal to approximately 50 milligrams of metal cations per gram of activated carbon; and ions at greater than or equal to approximately 25 milligrams of ions per gram of activated carbon. Activated carbon manufactured by the method of the invention is regeneratable within a filtration or other system without a need to remove the activated carbon from the system. The activated carbon is useful for treating wastewater, industrial waste, toxic waste, biohazardous waste, radioactive waste, contaminated water, contaminated air, contaminated biological materials, contaminated synthetic materials, or contaminated extraterrestrial materials. The activated carbon is also useful for recovering from a fluid metal ions, dyes, chemicals, radioactive materials, biological materials, synthetic materials, compounds, or extraterrestrial materials.

A primary object of the present invention is to provide an activated carbon capable of adsorbing large molecules, such as dyes, and ionic molecules, such as metal ions.

A primary advantage of the present invention is that the carbon material may be activated in a process that requires a comparatively low amount of energy thus allowing the activated carbon to be regenerated in-situ.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

DESCRIPTION OF THE PREFERRED EMBODIMENTS

The present invention is of a composition of matter and method of making and using same as an activated carbon suitable for adsorption of contaminants, toxins and even valuable constituents in fluid streams, particularly in waste streams such as effluent from dying processes, film processing, mining operations, jewelry production, plating operations, radionuclide processing, chemical warfare agent and weapon decommissioning, and others processes containing ionic or nonionic species.

Pecan shells are fractured, e.g., crushed and/or ground, to produce particles of a predetermined approximate size (preferably approximately 1 mm). The fracturing step uses mechanical or other forms of energy to drive a blade, a roller, or other device (e.g., phase change of supercritical $CO_2$, electrical discharge across a dielectric, and electromagnetic waves) capable of exerting, or causing something to exert, sufficient force to fracture the pecan shells into smaller particles. The particles are separated using a standard separation technique or a combination thereof, preferably by using sieves with different mesh sizes. When sieves are used for separation, the particles that pass through the predetermined large size (1 mm) mesh are again fractured to produce a powder with particle sizes less than a predetermined size (preferably approximately 75 $\mu$m). The powder is preferably washed with hot water (approximately 75° C.), and soaked for about ½ hour. The solution is allowed to cool to ambient temperature, and the powder soaked for about one day.

In a first embodiment, the powder is placed in an 85–95% phosphoric acid solution and heated to approximately 160–180° C. while forced air is introduced into the solution. Air, or another gas or liquid (e.g., hydrogen peroxide) containing oxygen molecules or gas or chemical that produces oxygen on contact with the mixing solution, is introduced through a variety of methods, including, but not limited to, a tube, an array of tubes, a manifold, or through a system integral with a mixing device. The mixture is agitated preferably by an impeller or other device that provides sufficient mixing and gas exchange. A sufficient degree of mixing may occur solely through the introduction of the gas. Once the mixture becomes fluid and starts to solidify, the color is observed to change from pink to black while foam containing the carbonaceous slurry is produced that moves up in the mixing vessel. Techniques or additives that enhance or either stabilize or destabilize the foam may be incorporated into the process, e.g., mechanical, physical, or chemical foam breakers, foam enhancers or foam stabilizers. The forced air supply is removed from the solution and focused over the foam to force it down while maintaining agitation. The position of the air stream is preferably in a shape to make the solution rotate about an axis that is parallel to the stirrer motion to establish a flow profile similar to liquid vortex. Once the mixture becomes solid, it is allowed to cool.

Three different methods may then be employed to thermally treat (carbonize) the solid mixture product. First, it may be placed in a muffle furnace at approximately 200° C. and kept for approximately one hour while the temperature is increased to approximately 350° C., then washed. Second, it may be kept at approximately 200° C. for approximately one hour, then washed. Third, it may be washed immediately.

The wash is preferably performed as follows: The product is washed approximately five times with hot, deionized water (approximately 50° C., pH 7.0) in a Büchner funnel. This removes and recovers residual acid from the product. The product is removed from the Büchner funnel and is placed in a container while adding a suitable amount of deionized water (approximately 1 L) while agitating. The pH is adjusted to approximately 10.0 to 12.0 (preferably 10.0). The mixture is agitated for approximately one hour to assure the micropores within the carbonaceous material are purged of gas. The solution is filtered and washed using cold, deionized water about two times to remove salts and hydroxide ion. The product is dried at ambient temperature or under hot air for about five hours.

In a second embodiment, the powder is placed in a sulfuric/nitric acid solution (approximately 85/5 v/v), while a stream of gas containing oxygen molecules, such as air, is introduced into the solution. The mixture is agitated. Once the powder is added into the acid solution, $NO_2$ gas with a dark yellow color starts to evolve and the mixture temperature is raised from room temperature to approximately 70° C. The hot mixture is heated up to approximately 120° C. with continuous agitation and injection of air. Once the mixture becomes fluid and starts to solidify, the color changes from pink to black. The stream of gas is kept in the solution but oriented in a direction to rotate the solution parallel to the stirrer motion to establish a flow profile similar to a vortex. Once the mixture solidifies, it is removed and the product is allowed to cool.

The product is preferably washed about three times with hot, deionized water (approximately 50° C., pH 7.0) in a Büchner funnel. This removes and recovers residual acid from the product. The recovered acid is sulfuric, and the nitric acid is evolved as $NO_x$. The product is moved from the Büchner funnel and is placed in a beaker with a suitable amount of deionized water (approximately 1 L). The solution is agitated while the pH is adjusted to approximately 10.0 to 12.0 (preferably 10.0). The mixture is agitated for about one hour to assure that the pores within the carbonaceous material are substantially purged of acid. The solution is filtered and washed using cold, deionized water about two times to remove inorganic and organic salts and ions, e.g., hydroxyl ions. The product is dried at ambient temperature or under hot air for about five hours.

Both embodiments of activated carbon were tested for absorption of methylene blue, $Cu^{2+}$, $Sr^{2+}$, and $Cd^{2+}$ and compared with commercially available activated carbon (CAC, brand: Norit SA Plus™). The following results were obtained:

TABLE 1

| Carbon Type | mg MB/g carbon | mg $Cu^{2+}$/g carbon | mg $Sr^{2+}$/g carbon | mg $Cd^{2+}$/g carbon |
|---|---|---|---|---|
| 1st Embodiment | >500 | 98 | 133 | 82 |
| 2nd Embodiment | 330 | Incomplete | Incomplete | 54 |
| CAC | 280 | 20 | 75 | 40 |
| Initial Solution Concentration | | 476 ppm | 300 ppm | 250 ppm |

The first embodiment was also compared to a sample of commercially available activated carbon (CAC), and to material that was prepared following common literature techniques for the adsorptive separation of methylene blue dye (MW=373.9) from water. The composition of the invention adsorbed 80% more dye than the commercially available activated carbon, as follows:

TABLE 2

| mg dye/g carbon | | |
|---|---|---|
| commercial available activated carbon (CAC) | literature preparation | 1st Embodiment |
| 265 | 193 | 480 |

The present invention provides higher adsorptivities of ionic metal ions and high molecular weight dyes using a low energy preparative method, from a readily available feedstock considered a waste by the agricultural community that produces it. Similar results occur for common aqueous contaminants including heavy metals and dissolved organics.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of producing an activated carbon, the method comprising the steps of:

a) fracturing nut hulls;
b) chemically activating the ground hulls in a solution wherein said chemically activating step comprises introducing into the solution at least one member selected from the group consisting of air, a substance containing oxygen molecules, a substance that causes the release of oxygen molecules upon contact with water, a substance that releases oxygen molecules upon a temperature change, and a substance that releases oxygen molecules upon a change in pH;
c) carbonizing the chemically activated hulls; and
d) washing the carbonized hulls.

2. The method of claim 1 wherein the fracturing step comprises reducing to a particle size of less than approximately 75 microns.

3. The method of claim 1 wherein the chemically activating step comprises a chemical solution containing at least one acid selected from a member of the group consisting of phosphoric acid, hydrochloric acid, sulphuric acid, nitric acid, carbonic acid, acetic acid, aluminum chloride, ferric chloride, and zinc chloride.

4. The method of claim 1 wherein the chemically activating step comprises a chemical solution containing at least one base selected from a member of the group consisting of sodium hydroxide, potassium hydroxide, ammonia, and monoethanolamine.

5. The method of claim 1 additionally comprising the step of soaking the ground hulls in water prior to the chemically activating step.

6. The method of claim 1 wherein the carbonizing step consists of washing the chemically activated hulls in the absence of heating.

7. The method of claim 1 wherein the carbonizing step comprises heating in a muffle furnace.

8. The method of claim 1 wherein the washing step comprises repeated washing with deionized water.

9. A method of producing an activated carbon, the method comprising the steps of:
a) fracturing nut hulls;
b) chemically activating the ground hulls in a solution wherein the chemically activating step comprises introducing into the solution at least one member selected from the group consisting of air, a substance containing oxygen molecules, a substance that causes the release of oxygen molecules upon contact with water, a substance that releases oxygen molecules upon a temperature change, and a substance that releases oxygen molecules upon a change in pH; and
c) carbonizing the chemically activated hulls wherein carbonizing comprises washing the chemically activated hulls.

10. The method of claim 9 wherein the fracturing step comprises reducing to a particle size of less than approximately 75 microns.

11. The method of claim 9 wherein the chemically activating step comprises a chemical solution containing at least one acid selected from a member of the group consisting of phosphoric acid, hydrochloric acid, sulphuric acid, nitric acid, carbonic acid, acetic acid, aluminum chloride, ferric chloride, and zinc chloride.

12. The method of claim 9 wherein the chemically activating step comprises a chemical solution containing at least one base selected from a member of the group consisting of sodium hydroxide, potassium hydroxide, ammonia, and monoethanolamine.

13. The method of claim 9 additionally comprising the step of soaking the ground hulls in water prior to the chemically activating step.

14. The method of claim 9 wherein the carbonizing step comprises heating in a muffle furnace.

15. The method of claim 9 wherein the washing step comprises repeated washing with deionized water.

16. The method of claim 9 wherein the washing step comprises agitation in basic solution.

17. A method of producing an activated carbon, the method comprising the steps of:
a) fracturing nut hulls;
b) chemically activating the ground hulls in a solution;
c) carbonizing the chemically activated hulls; and
d) washing the carbonized hulls wherein washing comprises agitation in a basic solution.

18. The method of claim 17 wherein the fracturing step comprises reducing to a particle size of less than approximately 75 microns.

19. The method of claim 17 wherein the chemically activating step comprises a chemical solution containing at least one acid selected from a member of the group consisting of phosphoric acid, hydrochloric acid, sulphuric acid, nitric acid, carbonic acid, acetic acid, aluminum chloride, ferric chloride, and zinc chloride.

20. The method of claim 17 wherein the chemically activating step comprises a chemical solution containing at least one base selected from a member of the group consisting of sodium hydroxide, potassium hydroxide, ammonia, and monoethanolamine.

21. The method of claim 17 wherein the chemically activating step comprises introducing into the solution at least one member selected from the group consisting of air, a substance containing oxygen molecules, a substance that causes the release of oxygen molecules upon contact with water, a substance that releases oxygen molecules upon a temperature change, and a substance that releases oxygen molecules upon a change in pH.

22. The method of claim 17 additionally comprising the step of soaking the ground hulls in water prior to the chemically activating step.

23. The method of claim 17 wherein the carbonizing step comprises washing the chemically activated hulls.

24. The method of claim 17 wherein the carbonizing step comprises heating in a muffle furnace.

25. The method of claim 17 wherein the washing step comprises repeated washing with deionized water.

26. A method of producing an activated carbon, the method comprising the steps of:
a) fracturing nut hulls;
b) chemically activating the ground hulls in a solution; and
c) carbonizing the chemically activated hulls wherein carbonizing comprises washing the chemically activated hulls and washing comprises agitation in a basic solution.

27. The method of claim 26 wherein the fracturing step comprises reducing to a particle size of less than approximately 75 microns.

28. The method of claim 26 wherein the chemically activating step comprises a chemical solution containing at least one acid selected from a member of the group consisting of phosphoric acid, hydrochloric acid, sulphuric acid, nitric acid, carbonic acid, acetic acid, aluminum chloride, ferric chloride, and zinc chloride.

29. The method of claim 26 wherein the chemically activating step comprises a chemical solution containing at least one base selected from a member of the group consisting of sodium hydroxide, potassium hydroxide, ammonia, and monoethanolamine.

30. The method of claim 26 wherein the chemically activating step comprises introducing into the solution at least one member selected from the group consisting of, air, a substance containing oxygen molecules, a substance that causes the release of oxygen molecules upon contact with water, a substance that releases oxygen molecules upon a temperature change, and a substance that releases oxygen molecules upon a change in pH.

31. The method of claim 26 additionally comprising the step of soaking the ground hulls in water prior to the chemically activating step.

32. The method of claim 26 wherein the carbonizing step comprises heating in a muffle furnace.

33. The method of claim 26 wherein the washing step comprises repeated washing with deionized water.

34. A method of producing an activated carbon, the method comprising the steps of:
   a) fracturing nut hulls;
   b) chemically activating the ground hulls in a solution wherein said chemically activating step comprises introducing into the solution at least one member selected from the group consisting of air, a substance containing oxygen molecules, a substance that causes the release of oxygen molecules upon contact with water, a substance that releases oxygen molecules upon a temperature change, and a substance that releases oxygen molecules upon a change in pH;
   c) carbonizing the chemically activated hulls; and
   d) washing the carbonized hulls wherein the washing step comprises agitation in basic solution.

35. The method of claim 34 wherein the fracturing step comprises reducing to a particle size of less than approximately 75 microns.

36. The method of claim 34 wherein the chemically activating step comprises a chemical solution containing at least one acid selected from a member of the group consisting of phosphoric acid, hydrochloric acid, sulphuric acid, nitric acid, carbonic acid, acetic acid, aluminum chloride, ferric chloride, and zinc chloride.

37. The method of claim 34 wherein the chemically activating step comprises a chemical solution containing at least one base selected from a member of the group consisting of sodium hydroxide, potassium hydroxide, ammonia, and monoethanolamine.

38. The method of claim 34 additionally comprising the step of soaking the ground hulls in water prior to the chemically activating step.

39. The method of claim 34 wherein the carbonizing step comprises washing the chemically activated hulls.

40. The method of claim 34 wherein the carbonizing step comprises heating in a muffle furnace.

41. The method of claim 34 wherein the washing step comprises repeated washing with deionized water.

42. A method of producing an activated carbon, the method comprising the steps of:
   a) fracturing nut hulls;
   b) chemically activating the ground hulls in a solution comprising at least one member selected from the group consisting of air, a substance containing oxygen molecules, a substance that causes the release of oxygen molecules upon contact with water, a substance that releases oxygen molecules upon a temperature change, and a substance that releases oxygen molecules upon a change in pH;
   c) carbonizing the chemically activated hulls wherein the carbonizing step comprises washing the chemically activated hulls in deionized water; and
   d) washing the carbonized hulls wherein the washing step comprises agitation in basic solution.

43. The method of claim 42 wherein the fracturing step comprises reducing to a particle size of less than approximately 75 microns.

44. The method of claim 42 wherein the chemically activating step comprises a chemical solution containing at least one acid selected from a member of the group consisting of phosphoric acid, hydrochloric acid, sulphuric acid, nitric acid, carbonic acid, acetic acid, aluminum chloride, ferric chloride, and zinc chloride.

45. The method of claim 42 wherein the chemically activating step comprises a chemical solution containing at least one base selected from a member of the group consisting of sodium hydroxide, potassium hydroxide, ammonia, and monoethanolamine.

46. The method of claim 42 additionally comprising the step of soaking the ground hulls in water prior to the chemically activating step.

47. The method of claim 42 wherein the carbonizing step comprises heating in a muffle furnace.

* * * * *